United States Patent [19]
Alpers

[11] 3,725,935
[45] Apr. 3, 1973

[54] LEADING EDGE DISCRIMINATOR CIRCUIT

[75] Inventor: Frederick C. Alpers, Riverside, Calif.

[73] Assignee: The United States of America as represented by the Secretary of the Navy

[22] Filed: Mar. 29, 1967

[21] Appl. No.: 627,596

[52] U.S. Cl..............................343/114.5, 343/7 A
[51] Int. Cl.................................................G01s 3/10
[58] Field of Search....................................343/114.5

[56] References Cited

UNITED STATES PATENTS

| | | |
|---|---|---|
| 2,223,995 | 12/1940 | Kotowski et al...............343/114.5 X |
| 2,225,524 | 12/1940 | Percival........................343/114.5 X |
| 2,310,692 | 2/1943 | Hansell.........................343/114.5 X |
| 2,237,895 | 4/1941 | Ulbricht........................343/114.5 X |

*Primary Examiner*—T. H. Tubbesing
*Attorney*—G. J. Rubens, J. M. St. Amand and T. M. Phillips

[57] ABSTRACT

An apparatus for use in the guidance systems of antiradar missiles to provide discrimination against echo signals when the target is a pulsed radar. It consists of circuits that permit only the leading portion of the first pulse received in each radar cycle to reach the seeker direction sensing circuits.

2 Claims, 5 Drawing Figures

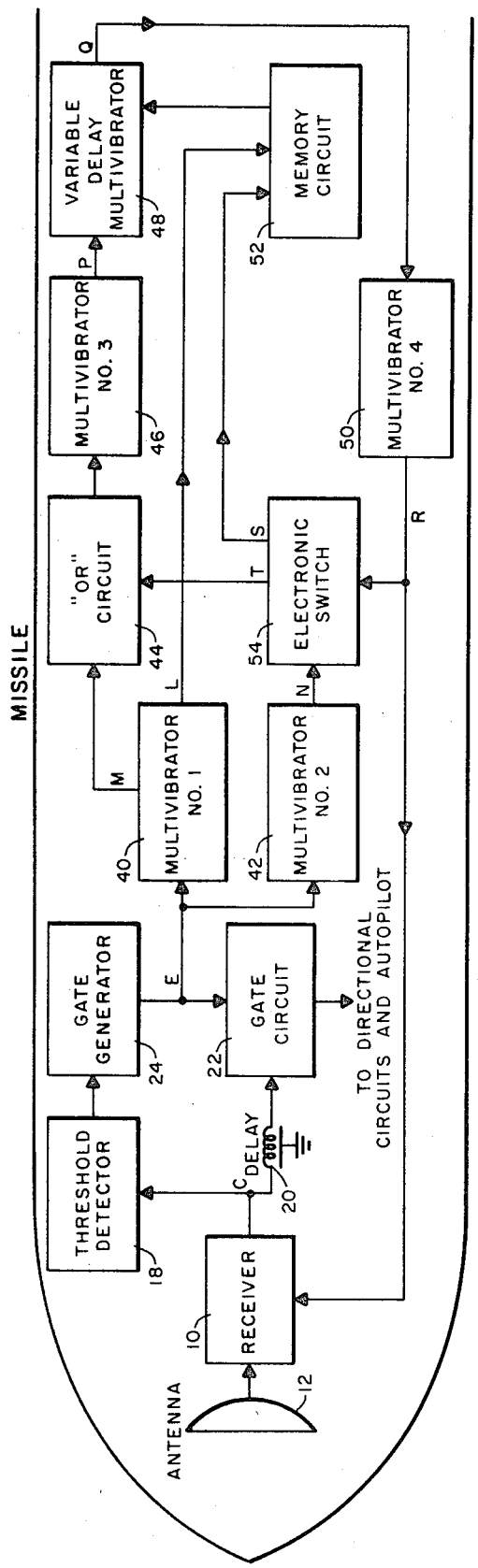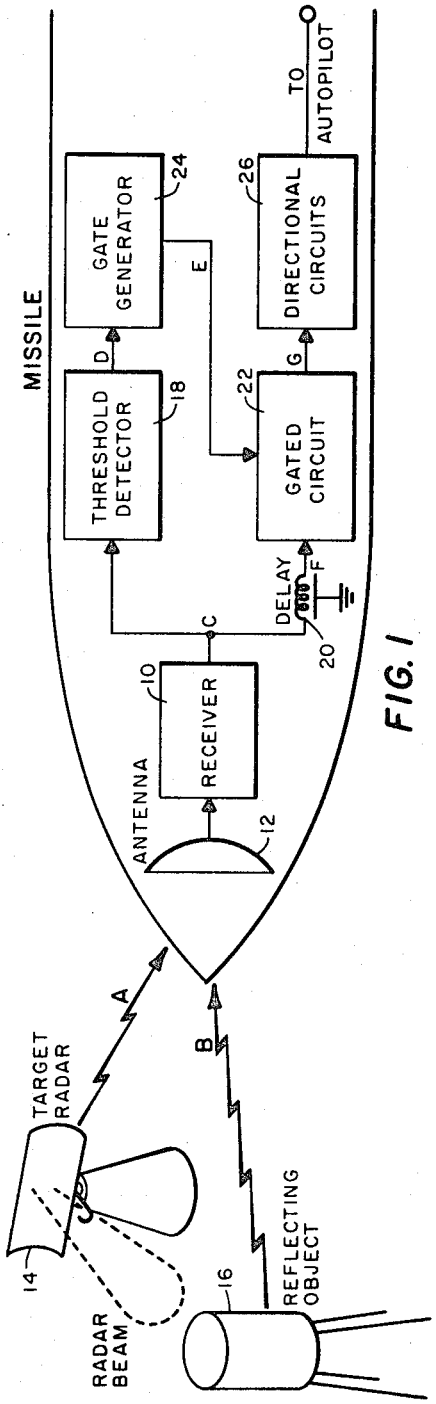

FREDERICK C. ALPERS
INVENTOR.

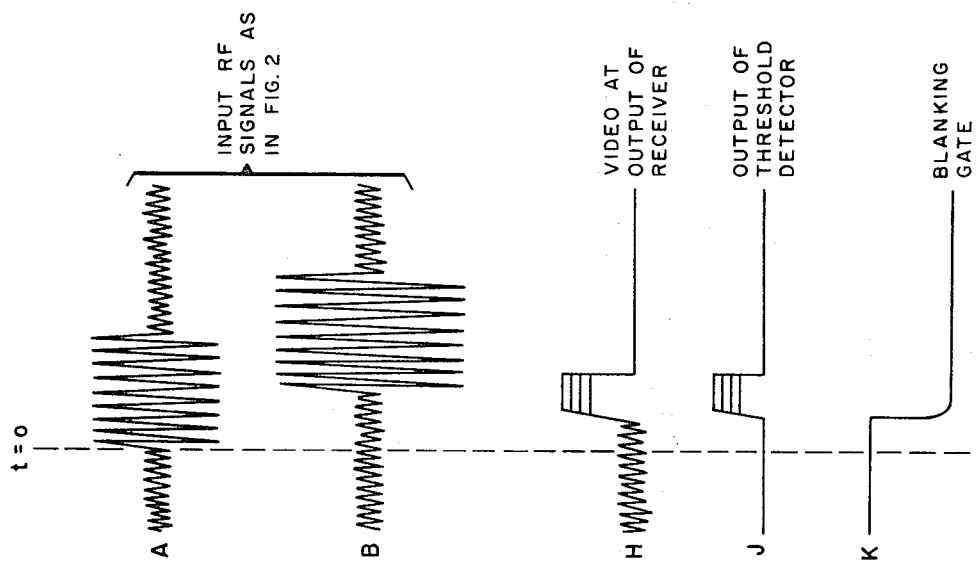

LEADING EDGE DISCRIMINATOR CIRCUIT

The invention herein described may be manufactured and used by or for the Government of the United States of America for governmental purposes without the payment of any royalties thereon or therefor.

BACKGROUND

The present invention relates to the field of missile guidance and more particularly to a circuit for discriminating against the effects of echo signals received from a reflecting object between the target radar and the missile. In early anti-radar missiles, the missile accepted whatever signals reached it that were at the designated frequency of the target, and thus guided toward some position that represented a mean locus between the radar and nearby objects that reflected strongly in the direction of the homing missile. Since the early missiles were designed to operate against rather primitive, low frequency radars that generally had high level back lobes in their antenna patterns, the direct signals from the radars were usually sufficiently strong that the distracting effect of echoes was a relatively minor problem. With the advent of the more sophisticated type radars, indications are that echo signals can degrade missile accuracy quite seriously, and the present invention provides a leading edge discriminator circuit which overcomes the above noted deficiencies of the prior known systems.

SUMMARY

The present invention provides a circuit which will permit only the leading edge of the signal that reaches the receiver of the missile to pass on to the directional circuits that govern missile guidance, and thus eliminates the distracting effects of echo signals that arrive later. The circuit for accomplishing the leading edge discriminator function includes a threshold detector, a gate generator, a gated video circuit and a short video delay line. The video signal supplied by the missile receiver is a composite of receiver noise; the signal direct from the target radar and one or more echo signals, both of which may be modulated with directional information relating to the respective sources. The composite signal is fed to both the threshold detector and the delay line. The output of the threshold detector triggers the gate generator which produces a gate that is much narrower than the received radar and echo pulses. Due to slight inherent delays in the functioning of the threshold and gate generator, the leading edge of the generated gate may lag the leading edge of the direct signal. It is desired that the direct signal lag the generated gate by a slight amount and this is accomplished by means of the delay line. The gated video circuit will pass only that portion of the composite signal that coincides in time with the generated gate. The output will then be gated video that retains directional modulation but pertains only to the radar signal received directly and not the echo signal.

Many of the attendant advantages of this invention will become readily appreciated as the same becomes better understood by reference to the following detailed description when considered in connection with the accompanying drawings wherein:

FIG. 1 is a block diagram of a leading edge discriminator embodying the invention.

FIG. 3 is a block diagram and waveforms of a feedback form of the invention.

FIG. 4 is a block diagram of the leading edge discriminator with a pulse repetition frequency tracking loop.

Figure 5:
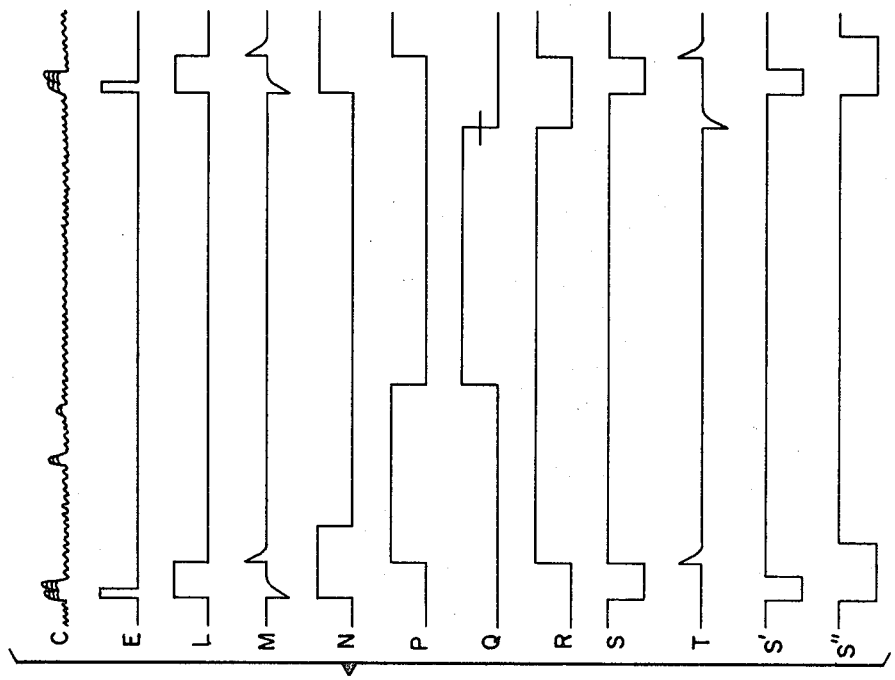
FIG. 5 is a graph of waveforms associated with the embodiment of FIG. 4.

Referring now to the drawings there is shown in FIG. 1 a receiver 10 and antenna 12 for receiving signals transmitted by a target radar 14 and reflected signals of radar 14 from a reflecting object such as a water tower 16. The output from receiver 10 is fed to threshold detector 18 and through delay line 20 to gate circuit 22. The output from threshold detector 18 provides a signal for gate generator 24 which generates a gate for gate circuit 22. The gated signal passed by gate circuit 22 is fed to directional circuits 26 for providing guidance signals to the autopilot.

Figure 2:
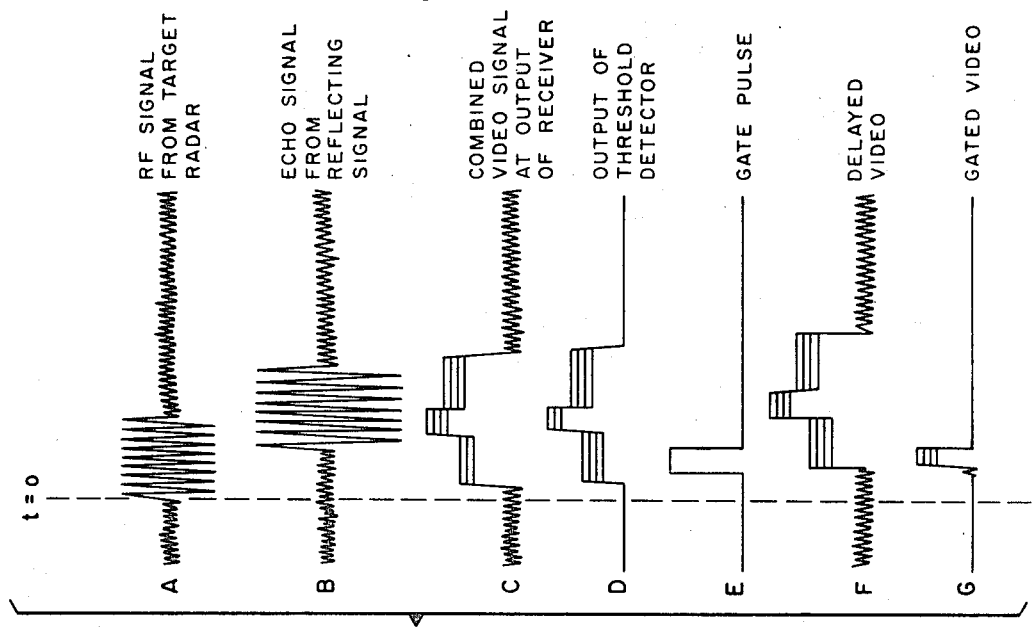
FIG. 2 is a graph of waveforms associated with the embodiment of FIG. 1.

In operation and as is shown in FIGS. 1 and 2 the energy in both waveforms A and B comes originally from the same transmitter pulse, but because of the geometry involved, waveform A will always arrive at receiver 10 slightly ahead of waveform B. The output signal from receiver 10 (waveform C) is composed of receiver noise, the signal direct from radar 14 and one or more echo signals. The direct and echo signals may each be modulated with directional information relating to the respective sources. The composite signal is fed to delay line 20 and threshold detector 18 which may be a diode or amplifier that either builds up a back bias against receiver noise or is provided with a dc bias to prevent signals of noise level from passing. Only signals are passed which exceed the threshold level to eliminate noise from the output when no input signal is present. The output from threshold detector 18, waveform D, triggers gate generator 24 which produces an output gate, waveform E, which is much narrower than the received radar and echo pulses. Gate generator 24 may be a blocking oscillator, thyratron, or other gate forming circuit with sufficient recovery time to prevent retriggering until echoes associated with that particular direct signal have passed. Due to slight inherent delays in the functioning of threshold detector 18 and gate generator 24, the leading edge of waveform gate E may lag the leading edge of the direct signal in composite waveform C by a small amount, whereas a slight lead by the gate is desired. The desired relative timing of the two signals is achieved by means of delay line 20 which delays waveform C to provide waveform F. Gate circuit 22 may be a diode gating circuit or a gated video amplifier and only that portion of waveform F that coincides in time with gate E will be passed. The output waveform G then will be gated video that retains directional modulation but pertains only to the direct radar signal A.

In the modification shown in FIG. 3 with the accompanying waveforms, threshold detector 30 functions in the same manner as detector 18 of FIG. 1. The output signal from detector 30 triggers a blanking gate generator 32 which generates a blanking gate that is fed to the input stage of receiver 10. The direct signal, waveform A, received at antenna 12 encounters an inherent delay in passing through receiver 10. This is illustrated by the time lag between the rise of waveform A and that of waveform H. The rise of waveform J causes the generation of blanking gate K which blocks the passage of any further signal through receiver 10. If, as shown, the leading edge of waveform K precedes that of echo signal B, only a portion of the direct signal will have been allowed to pass prior to signal cut-off. The effect of this cut-off action appears as a cessation of both signals and noise in the output waveform H which is fed to directional circuits 26.

The modification shown in FIG. 4 and illustrated by waveforms in FIg. 5, is useful when the target radar has a moderately regularly pulse repetition frequency and it is desired to exclude from the missile directional circuits any echoes or other spurious signals that might occur when phase tracking of a particular pulse within the cycle. Threshold detector 18, gate generator 24, delay line 20, and gate circuit 22 function in the same manner as described above in the description of FIG. 1. The output from gate generator 24 is coupled to multivibrators 40 and 42. The output of multivibrator 40 is coupled through "or" circuit 44 to multivibrator 46 which triggers variable delay multivibrator 48 to initiate multivibrator 50. Variable delay multivibrator 48 is controlled by memory circuit 52 which has inputs from multivibrator 40 and electronic switch 54. The output of multivibrator 50 is fed to receiver 10 and electronic switch 54.

In describing the operation of the embodiment of FIG. 4 reference is made to both FIGS. 4 and 5. Gate signal (waveform E) is supplied as the triggering pulse for multivibrators 40 and 42 which serve triggering, switching, and delay correction functions within the tracking loop, and the loop then feeds back into the discriminator function by controlling the times at which receiver 10 is blanked and open. Multivibrator 40 is triggered by gate E in synchronism with reception of the desired direct signal from the target radar and produces a short duration positive gate of fixed width (waveform L) and a differentiated waveform M. The positive pulse of waveform M is passed by "OR" circuit 44 to trigger multivibrator 46 which generates a fixed time interval (waveform P) that comprises a substantial portion of the period of the radar PRF cycle, and its trailing edge triggers variable delay multivibrator 48 to generate waveform Q. The time interval introduced by multivibrator 40, 46, and 48 comprises a total delay that determines the approximate period of the radar cycle insofar as the tracking loop action is concerned. The variable trailing edge of waveform Q is used to trigger multivibrator 50, which is designed to produce a negative output gate (waveform R) twice the gate width of waveform L. Gate R is fed back to and unblanks receiver 10 when a direct signal from a selected target is expected to be received. The coupling of gate R to receiver 10 should be of a self biasing type so that receiver 10 will be in an open condition when the circuit is first activated.

Gate R is also fed to electronic switch 54 which is controlled by the output of multivibrator 42 (gate N) which is also twice the width of gate L. When gate R is present, the radar signal reaching receiver 10 will cause gate generator 24 to generate gate E, which triggers multivibrator 42. With gate N present electronic switch 54 will allow gate R to pass as a negative waveform S, but only that portion of gate R which is present during the presence of gate N will pass and waveform S will commence with the leading edge of gate N and will cease with the trailing edge of gate R. When gate E occurs precisely in the middle of gate R, waveform S will have half the width of gate R, which makes waveforms L and S of equal width but opposite polarity. If the total timing of the multivibrator series is shorter than the period of the received radar signal, gate E will appear during the second half of gate R, resulting in waveform S'. Similarly, if the relative timing causes gate E to appear during the first half of gate R waveform S'' will result. In order to close the tracking loop, waveforms S, S', and S'' are fed to memory circuit 52 which may be an isolated capacitor that supplies a dc control voltage to control the delay interval generated by variable delay multivibrator 48. If the oppositely polarized L and S gates are of equal width, the net change in the voltage of memory circuit 52 will be zero, and the timing of the tracking loop will remain unchanged. If, instead gate S takes on the shorter width of gate S', the positive gate L will predominate and the memory voltage will become more positive, the triggering of multivibrator 50 will be delayed and the later timing of gate R will tend to widen gate S and restore the balanced tracking condition. Similarly, a gate S widened to gate S'' will produce a more negative memory voltage, less delay in the triggering of multivibrator 50, and a tendency to restore balanced tracking.

Electronic switch 54 should be of the double throw type so that when gate N is absent due to missing of a received target signal in receiver 10, a differentiated form of gate R (waveform T) is switched to "OR" circuit for retriggering the tracking loop. As shown in FIG. 5, the positive pulse in waveform T will be blocked by electronic switch 54 whenever a signal above threshold is actually received during waveform R and is timed to occur at the same time that the positive pulse in waveform would occur if a signal were present in the middle of waveform R as expected. Phase memory is then retained by the tracking loop automatically retriggering itself when a target signal is not received with the proper time interval.

In actual use of the leading edge discriminator in combination with the pulse repetition frequency (PRF) tracking loop, lock-on of the loop can be obtained by setting the receiver at full gain and the total loop delay interval approximately equal to the PRF period. Any slight mismatch in time intervals will cause the loop to drift in phase with respect to the radar until some signal, echo or not, occurs during gate R and starts correction of the loop timing. If gate R is reasonably wide, the leading edge discriminator circuit will then cause the loop phase to advance so that tracking of the direct radar signal rather than an echo signal is achieved. Generally, lock-on is effected prior to missile launch by manual control of the loop being by an operator. The widths of gates L, N, and R may also be adjusted for the degree of PRF discrimination desired.

Obviously many modifications and variations of the present invention are possible in the light of the above teachings. It is therefore to be understood that within the scope of the appended claims the invention may be practiced otherwise than as specifically described.

What is claimed is:

1. A leading edge discriminator circuit for use in radar target tracking comprising:
   a. a radar receiver circuit means for receiving radar signals,
   b. threshold detector circuit means coupled to said radar receiver circuit means for passing received signals which exceed a predetermined amplitude,
   c. a first gate generator circuit coupled to said threshold detector circuit means for generating a gate signal in response to the signal passed by said detector circuit means,
   d. a gate circuit having a first input, a second input and an output,
   e. delay circuit means coupling the output of said receiver to the first input of said gate circuit and circuit means coupling the gate signal from said gate generating circuit to the second input of said gate circuit whereby signals from said receiver will be passed by said gate circuit during the presence of a gate signal from said gate generator,
   f. a second gate generating circuit coupled to said first gate generating circuit for generating a gate having a width of duration equal to the expected variation in pulse interval of the target radar,
   g. a third gate generating circuit coupled to said first gate generating circuit for generating a gate having a width of twice the width of the gate generated by said second gate generating circuit,
   h. variable width gate generating means coupled to said second and third gate generating circuits and having an output coupled to said receiver for controlling the time at which said receiver will receive signals,
   i. comparison circuit means coupled to said second and third gate generating circuits and to said variable width gate generating means for generating a control voltage to maintain the trailing edge of said variable width gate in the center of the output of said third gate generating circuit.

2. A leading edge discriminator circuit for use in radar target tracking comprising:
   a. a radar receiver circuit means for receiving radar signals,
   b. threshold detector circuit means coupled to said radar receiver circuit means for passing received signals which exceed a predetermined amplitude,
   c. a first gate generator circuit coupled to said threshold detector circuit means for generating a gate signal in response to the signal passed by said detector circuit means,
   d. a gate circuit having a first input, a second input and an output,
   e. delay circuit means coupling the output of said receiver to the first input of said gate circuit and circuit means coupling the gate signal from said gate generating circuit to the second input of said gate circuit whereby signals from said receiver will be passed by said gate circuit during the presence of a gate signal from said gate generator,
   f. a first multivibrator coupled to said gate generator and being triggered to synchronism with the reception of a desired target signal to produce a short positive gate of fixed width and a positive pulse,
   g. an "or" circuit coupled to said first multivibrator,
   h. a second multivibrator coupled to said "or" circuit and being responsive to the positive pulse passed by said "or" circuit to generate a fixed gate,
   i. a variable delay multivibrator coupled to said second multivibrator and generating a variable width gate in response to the trailing edge of the output gate from said second multivibrator so that the total time duration of said second multivibrator fixed gate plus said variable delay multivibrator variable gate is approximately equal to the period of the target radar PRF cycle,
   j. a third multivibrator for generating an unblanking gate that is fed to said radar receiver in response to the trailing edge of the variable gate from said variable delay multivibrator,
   k. a fourth multivibrator coupled to said gate generator and being triggered in synchronism with the reception of a desired target signal to generate a fixed width positive gate which is twice the width of the fixed width gate of said first multivibrator,
   l. an electronic switch coupled to said third and fourth multivibrators for passing the output gate of said third multivibrator when an output gate is present from said fourth multivibrator,
   m. memory circuit means coupled to said first multivibrator and said electronic switch and having an output coupled to said variable delay multivibrator for producing a control voltage to said variable delay multivibrator when there is a difference in the gate width generated by said first multivibrator and passed by said electronic switch.

* * * * *